(12) United States Patent
Hoeksel

(10) Patent No.: US 8,185,629 B2
(45) Date of Patent: May 22, 2012

(54) ACCESS CONTROL FOR M2M DEVICES IN A MOBILE COMMUNICATION NETWORK

(75) Inventor: Sebastiaan Hoeksel, Maastricht (NL)

(73) Assignee: Vodafone Holding GmbH, Dusseldorf (DE)

( * ) Notice: Subject to any disclaimer, the term of this patent is extended or adjusted under 35 U.S.C. 154(b) by 130 days.

(21) Appl. No.: 12/592,726

(22) Filed: Dec. 1, 2009

(65) Prior Publication Data

US 2010/0146117 A1    Jun. 10, 2010

(30) Foreign Application Priority Data

Dec. 1, 2008    (EP) .................................... 08170386

(51) Int. Cl.
*G06F 15/173* (2006.01)
(52) U.S. Cl. ...... 709/225; 709/229; 370/230; 370/230.1
(58) Field of Classification Search .................... None
See application file for complete search history.

(56) References Cited

U.S. PATENT DOCUMENTS

| | | | |
|---|---|---|---|
| 5,729,542 A | 3/1998 | Dupont | |
| 2002/0110085 A1 | 8/2002 | Ho et al. | |
| 2004/0209623 A1* | 10/2004 | Sauter et al. | 455/453 |
| 2011/0128911 A1* | 6/2011 | Shaheen | 370/328 |
| 2011/0182177 A1* | 7/2011 | Sedlacek et al. | 370/230 |
| 2011/0199898 A1* | 8/2011 | Cho et al. | 370/230 |
| 2011/0269473 A1* | 11/2011 | Ronneke et al. | 455/445 |

FOREIGN PATENT DOCUMENTS

WO    WO 00/07401    2/2000

* cited by examiner

*Primary Examiner* — Mohamed Ibrahim
(74) *Attorney, Agent, or Firm* — Lawrence G. Fridman

(57) ABSTRACT

A method of controlling an access to a public mobile communication network by a device for transmission of data is provided. The method comprises the step of accessing the mobile communication network by the device at a predetermined time and date. For this purpose a network traffic load information is transmitted from an entity connected to the mobile communication network to the device. Subsequently the time and date of an access to the mobile communication network by the device is determined with consideration of the received network load information. A corresponding system for controlling an access of a device to a public mobile communication network for transmitting data is also provided.

14 Claims, 1 Drawing Sheet

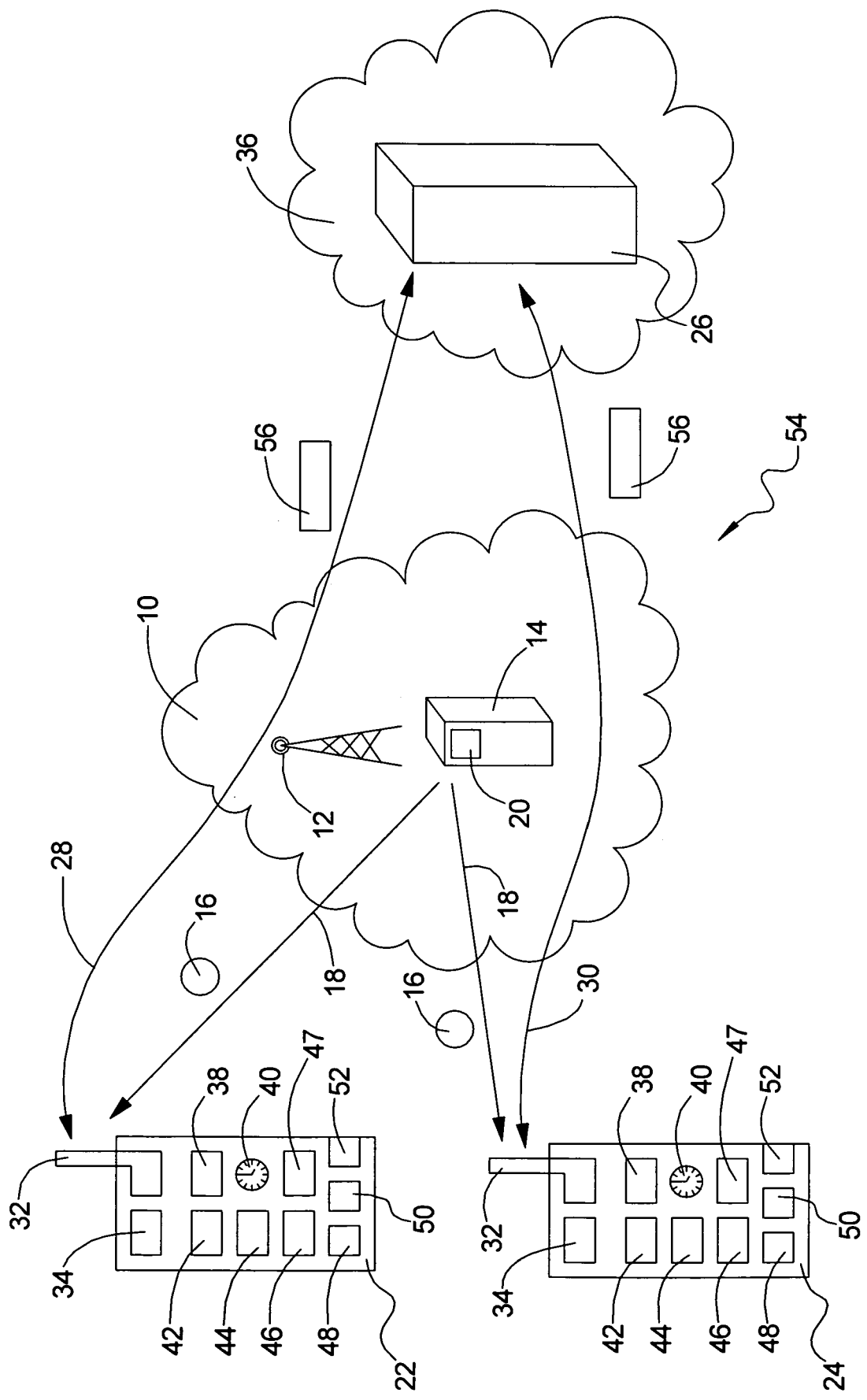

ACCESS CONTROL FOR M2M DEVICES IN A MOBILE COMMUNICATION NETWORK

This patent application claims priority of European Patent Application No. 08 170 386.0 filed Dec. 1, 2008.

FIELD OF THE INVENTION

The present invention relates to a method of controlling an access to a public mobile communication network by a device for transmission of data. Furthermore the present invention also relates to a corresponding system for controlling an access of a device to a public mobile radio network for transmitting data.

BACKGROUND OF THE INVENTION

Machine to Machine (M2M) communication is known as a form of data communication between devices that do not necessarily need human interaction and in general refers to telemetry. Using wireless mobile communications networks like a GSM/GPRS (Global System for Mobile Communication/General Packet Radio Service) or UMTS (Universal Mobile Telecommunication System) network enables a communication with mobile M2M devices and a cost-effective communication with localized devices, since expensive installation and maintenance of wired connections is not required.

Metering of power, gas, water and heating, monitoring of alarm systems, vending machines, medical devices and vital life functions, tracking and tracing of vehicles and road tolling are only a few examples in the very wide field of possible M2M applications. In recent years, the cost of access to public mobile data networks has been dropping while the capabilities of these networks continue to increase. The M2M device, software, network and service market is expected to grow rapidly worldwide in the next few years.

The wide-scale introduction of M2M devices in mobile networks will change network traffic profiles and traffic volumes and requires mobile network operators to rethink how to manage access to shared network resources. In contrast to various traditional mobile network services, where users expect an immediate access and response, for many M2M services immediacy is not a strong requirement. An effective access control is obviously relevant for non time critical M2M services that generate large volumes of network traffic but also for those M2M services that generate low traffic but have a large number of M2M devices deployed in the field.

Known access controls of M2M devices either permit an autonomous access to a mobile network for data exchange in a predetermined period or a specific time and date or use a centralized management of access, for example a server connected to the mobile network requesting data from the M2M devices.

Adversely a centralized management function that controls when an individual M2M device is allowed to exchange data does not scale well and necessitates additional signalling traffic towards every individual M2M device. Otherwise, when M2M devices autonomously decide on the moment in time at which to start exchanging data over a mobile network there is a risk that all devices start communicating simultaneously which may overload the network signalling or data channels.

The technical report 3GPP TR 22.868 proposes to instruct a group of M2M devices to transmit mobile network location updates at a specific date and time. A disadvantage of this approach is that the assumption is being made that the pattern of mobile network traffic load remains constant. This assumption may be true for M2M devices at a fixed geographic location, but not for mobile M2M devices as in this case mobile network traffic load patterns may vary with geographic location. Furthermore this approach does not considers that mobile network traffic load patterns may vary with time because of changes in local conditions, for example a music event or traffic jam may cause a peak load in mobile network traffic.

SUMMARY OF THE INVENTION

The present invention relates to a method of controlling an access to a public mobile communication network by a device for transmission of data, the method comprising at least the step of:
  accessing the mobile communication network by the device at a predetermined time and date.

Furthermore the present invention relates to a corresponding system for controlling an access of a device to a public mobile radio network for transmitting data, the system comprising at least
  an access control unit for the device for accessing the mobile communication network by the device at a predetermined time and date.

An essential object of the present invention is to alleviate the drawbacks described above and to provide an efficient and resource-saving access control to a device for transmitting data via a mobile communication network.

According to the present invention the objects are achieved by a method of controlling an access to a public mobile communication network by a device for transmission of data, the method further comprises the steps of:
  transmitting a network traffic load information from an entity connected to the mobile communication network to the device, and
  determining the time and date of an access to the mobile communication network by the device with consideration of the received network load information.

Furthermore, a corresponding system for controlling an access of a device to a public mobile communication network for transmitting data, the objects of the Invention are achieved by means of the system which further comprises
  a network load information entity connected to the mobile communication network for transmitting a network traffic load information to the device, and
  a network load information unit for the device receiving network traffic load information and determining the time and date of an access to the mobile communication network by the device with consideration of the network traffic load information.

BRIEF DESCRIPTION OF THE DRAWING

FIG. 1 is a schematic diagram showing an embodiment of a method and a system of the present invention for controlling an access to a public mobile communication network by a device for transmission of data.

DETAILED DESCRIPTION OF THE INVENTION

The basic principle of the present invention is to provide network traffic load information to the device for determining a time and date of accessing a public mobile communication network. The network traffic load information e.g. contains information about an actual present or estimated future traffic load in the mobile communication network. For example the network traffic load information comprises a regular time-dependent pattern of predicted traffic load which may repeat every twenty-four hours. Further on the network traffic load information may vary with an actual geographic location or region of the device and may also change due to irregular predicted events (e.g. a music event) or not predicted events (e.g. a traffic jam). Using the network traffic load information a most favourable time and date for accessing the mobile communication network is determined by the device. Thereby further information like for example urgency of data transmission can also be considered. At the determined time and date the device autonomously accesses the mobile communication network to transmit or receive data.

With the system according to the present invention this approach is accomplished by the network load information entity transmitting network traffic load information to the network load information unit of the device and subsequently determining the most favourable time and date by the network load information unit. The network load information unit can be comprised by the device or an access control unit of the device and the determination of the access time and date by the network load information unit can be assisted by the access control unit or another entity of the device.

In doing so the method and the corresponding system according to the present invention effectively reduce peaks in mobile network traffic, since the determination of a time and date with little network traffic load is achievable by the device. This circumstance leads to a resource-saving control of access for devices using a mobile communication network for transmission of data and hence minimizes necessary investments in mobile network resources by a mobile network operator.

A preferred embodiment of the method of controlling an access to a public mobile communication network by a device for transmission of data according to the present invention is based on broadcasting the network traffic load information from a broadcast unit of the mobile communication network to at least on device via the mobile communication network. By using a broadcast function in a mobile communication network information is send on one channel and received by all devices watching this channel for transmitted data. Addresses of receiving devices are not required when sending the information. Thus a circumstantial transmission of information directed to each device separately using a respective address is avoided. This significantly reduces the effort of transmitting the same network traffic load information to a plurality of devices.

In another advanced embodiment of the method according to the present invention the time and date of access is determined with consideration of a device identifier. The device identifier for example can be a unique identity like an IMEI (International Mobile Station Equipment Identity) or an IMSI (International Mobile Subscriber Identity). A device identifier for devices of a specified group of devices is also possible. In this way a simultaneous access to the mobile communication network by all devices of a group receiving the same network traffic load information is effectively avoided. For example if the network traffic load information contains a time interval of minor load, the determination of the time of access within the interval can depend on the device identifier for each device respectively. Thus a peek of traffic load or an overload of network signalling and data channels due to a large number of devices simultaneously starting communication are prevented.

In a further advantageous embodiment of the method according to the present invention the time and date of access is determined with consideration of a random number generated by a random number generator. For example the random number determines the time of access within a time interval of minor load for each device respectively. Again a simultaneous access to the mobile communication network by all devices of a group receiving the same network traffic load information causing a peek of traffic load is effectively avoided.

Preferably, accessing to the mobile communication network comprises uploading data from the device to a server connected to the mobile communication network in an embodiment of the method according to the present invention. For example the device is one of a plurality of terminals uploading data to a central server. This kind of M2M communication is very common. Hence, this embodiment provides a large number of devices with an effective and resource-saving access control having further abovementioned advantages.

A preferred embodiment of the system according to the invention for controlling an access of a device to a public mobile radio network for transmitting data comprises a broadcast unit in the mobile communication network broadcasting the network traffic load information to at least on device via the mobile communication network. According to the corresponding embodiment of the inventive method the broadcast unit facilitates the transmission of equal network traffic load information to a plurality of devices. An expensive and circumstantial transmission directed to each device separately using a respective address is avoided.

Another advantageous embodiment of the system according to the invention is based on a device identifier module for the device determining the time and date of an access depending on a device identifier of the device. The device identifier module uses a device identifier like an IMEI, an IMSI or another identifier identifying the device within a group of devices. With the device identifier the device identifier module supports a determination of access time and date or determines it. For this purpose the network traffic load information is considered. For example if the network traffic load information contains a time interval of minor load, the determination of the time of access within the interval can depend on the device identifier for each device respectively. In doing so a simultaneous access of all devices of a group of devices to the mobile communication network with a peek of traffic load or an overload of network signalling and data channels is effectively avoided.

Referring now to FIG. 1 a mobile network is shown and designated by the numeral 10. For example, the mobile communication network 10 accords to the GSM/GPRS, UMTS, CDMA2000, FOMA, TD-SCDMA or WiMAX standard or a fourth generation standard. These mobile communication networks with the corresponding elements and functions are well known by those who are skilled in the art. To simplify matters the mobile communication network 10 is shown stylised as a cloud in FIG. 1 including a radio mast 12.

The mobile communication network 10 comprises a network load information entity 14 for transmitting network traffic load information 16 to devices using a M2M (Machine to Machine) communication. In this example the network traffic load information 16 is broadcasted, arrows 18, via the mobile communication network 10 by a broadcast unit 20 comprised by the network load information entity 14. In other embodiments the broadcast unit 20 can be disposed separately from the network load information entity 14 in the mobile communication network 10. The network traffic load information 16 for example contains information about an actual present or estimated future traffic load in the mobile communication network 10. Future traffic load can for example be estimated with consideration of known present or past traffic load and geographic location and time of special events like traffic jams or music events. Further on the network traffic load information 16 can depend on an actual geographic location or region of devices to which the network traffic load information 16 is transmitted. For example the network traffic load information 16 can contain time intervals or points of time with corresponding network load values or a time-dependent pattern of predicted traffic load repeating e.g. every twenty-four hours.

In FIG. 1 three devices 22, 24, 26 using M2M communication are shown. This means, the devices transfer data among each other in an autonomous manner without necessary human interaction. In this embodiment the devices 22 and 24 act as terminals transmitting data to and receiving commands from the device 26 used as a server. For this purpose the devices 22, 24, 26 establish connections 28 and 30 via the mobile communication network 10 symbolized as arrows in FIG. 1.

Each of the devices 22 and 24 comprise a radio interface 32 for accessing the mobile communication network 10. An access is accomplish by the radio interface 32 and a subscriber identification module 34 contained by both devices 22 and 24 respectively. The subscriber identification module 34 is used for authentication and authorization of the device and a device operator by the mobile communication network 10.

The device 26 accesses the mobile communication network 10 with a wireless or wired connection provided by a data communication network 36, for example a wired telecommunication network, the interne or a mobile radio network. These kinds of data communication networks with the corresponding elements and functions are well known by those who are skilled in the art. To simplify matters the data communication network 34 is symbolized as a cloud in FIG. 1. Alternatively the device 26 can comprise a radio interface not shown in FIG. 1 for directly accessing the mobile communication network 10.

The devices 22 and 24 comprise an access control unit 38 and a timer 40 for controlling an autonomous access to the mobile communication network 10 at a predetermined time and date. Further the devices 22, 24 are provided by a network load information unit 42 for receiving the broadcasted network traffic load information 16 and determining an access time and date. Additional the devices 22, 24 have a unique device identifier 44, for example an International Mobile Station Equipment Identity (IMEI), an International Mobile Subscriber Identity (IMSI) or a serial number. With a device identifier module 46 the device identifier 44 is considered by determining an access time and date. A random number generated by a random number generator 47 provided to the devices 22, 24 can also be considered when determining the access time and date. Thus the determination of the access time is accomplished by the network load information unit 42 supported by the access control unit 38, the device identifier unit 38 and/or the random number generator 47. In an alternative embodiment the network load information unit 42, the device identifier module 46 and the random number generator 47 can be comprised by the access control unit 38 determining an access time and date.

The devices 22 and 24 also contain sensors 48 for detecting events or data, controllers 50 for controlling further functions and means of the devices 22, 24 and interfaces 52 for sending or receiving data from other devices not shown in FIG. 1. For example the devices 22 and 24 are or are connected to devices for metering of power, gas, water, heating, industrial metering devices, home, public and industrial alarm devices, vending machines, gaming machines, domestic appliances, electronic entertainment devices, medical devices, tracking, tracing and diagnostic devices for vehicles, road tolling devices and so on.

The access control units 38 and the network load information units 42 of the devices 22 and 24 together with the network load information entity 14 in the mobile communication network 10 and other above-described components constitute a system 54 for controlling the access of the devices 22, 24 to the mobile communication network 10 for transmission of data 56 from the devices 22 and 24 to the device 26 and the reverse way.

In the following the functionality of the system 54 and the steps of the method according to the embodiment are described in more detail.

At first the access control unit 38 of a device 22, 24 detects a local event or an according signal requesting access to the mobile communication network 10 for transmitting data 56. For example the local event or signal can be generated by the device 22, 24, 26, the timer 40, a sensor 48, a controller 50, a device connected to an interface 52 or by the access control unit 38 itself. The local event can be a certain time or date, a filled up memory, an event detected by a sensor 48 or the like.

If the requested data transfer is very time-critical the access control unit 38 immediately actuates an access to the mobile communication network 10 for data transmission. Otherwise the access control unit 38 interrogates the network load information unit 42 for network traffic load information 16. The network load information unit 42 has already received valid network traffic load information 16 or starts watching for this information. The network traffic load information 16 is broadcasted 18 by the broadcast unit 20 of the network load information entity 14 in the mobile communication network 10. In general the network traffic load information 16 is a function of network traffic load over time. For example and better understanding the network traffic load information 16 may contain information like: "Traffic load is 120% of daily average for the next hour and 70% of daily average in the following second hour".

The access control unit 38 examines the network traffic load information 16 and determines a time and date of access by using predefined rules. For example a rule could be: "Start access if predicted traffic load is less than 80% of daily average and consider device identifier 44". In this case with the abovementioned network traffic load information 16 the access control unit 38 firstly determines that an access to the mobile communication network 10 should be accomplished in the second hour. A support of the determination by the network load information unit 42 is possible. Optionally the urgency of data transmission can be considered in this determination.

Subsequently the access control unit 38 requests the device identifier 44 from the device identifier module 46 and/or a random number from the random number generator 47 and determines the exact time and date of an access to the mobile communication network 10 by using further predefined rules. For example the exact access time and date can be determined by: "device identifier 44 modulus sixty" or "random number modulus sixty". In this way the minute in the second hour for accessing the mobile communication network 10 is determined for each device 22, 24 respectively. Optionally this determination can be supported by the device identifier module 46 and/or the random number generator 47. Thus a simultaneously access of the devices 22 and 24 is prevented.

Finally the access control unit 38 actuates an access to the mobile communication network 10 at the determined time and date. A connection 28, 30 is established between the device 22, 24 and the device 26 via the mobile communication network 10 and data 56 is transferred. The transmission of data 56 can be uploading data 56 from the devices 22 and 24 to the server device 26 or downloading data 56, e.g. commands, from the device 26 to the devices 22 and 24 used as terminals.

In this manner the described method and the system 54 effectively reduce peaks in mobile network traffic in the mobile communication network 10, since determining time and date with little network traffic load is achievable by the devices 22, 24.

What is claimed is:

1. A method of controlling an access to a public mobile communication network by at least one communication device for transmission of data, said communication device having an access control unit for controlling data transmission, the method comprising the steps of:
   providing an access control unit for controlling a data transmission from at least one communication device to a public mobile communication network;
   providing network load information comprising a time-dependent pattern of an estimated future traffic load depending on an actual geographic location of said at least one communication device having said access control unit;
   transmitting said estimated future network load information from an entity associated with said mobile communication network to said access control unit;
   processing said estimated future network load by said access control unit and determining a favorable time and date for the access to said mobile communication network by said communication device based on said estimated future network load information; and
   accessing said public mobile communication network by said at least one communication device having said access control unit at said favorable time and date.

2. The method according to claim 1, wherein said step of determining the favorable time and date for accessing the said public mobile communication network further includes utilizing a device identifier module.

3. The method according to claim 2, wherein said device identifier module identifies a mobile subscriber identity.

4. The method according to claim 1, further comprising a step of broadcasting said estimated network traffic load information from a broadcast unit of said mobile communication network to said at least one communication device via said mobile communication network.

5. The method according to claim 1, further comprising a step of determining the favorable time and date of access with consideration of a random number generated by a random number generator.

6. The method according to claim 1, wherein the step of accessing to said mobile communication network comprises uploading data from said device to a server connected to said mobile communication network.

7. The method according to claim 1, wherein said access control device determines the favorable time and date of the access with consideration of an urgency of data transmission.

8. A system for controlling an access to a public mobile communication network by at least one communication device having an access control unit for controlling data transmission, said system comprising:
   an access control unit for controlling data transmission from a communication device to a public mobile communication network;
   an entity associated with said mobile communication network, said entity providing a network load information comprising a time-dependent pattern of an estimated future traffic load depending on an actual geographic location of the communication device, said entity capable of transmitting said estimated future network load information to said access control unit;
   said access control unit processes said estimated future network load and determines a favorable time and date for accessing said mobile communication network by said at least one communication device based on said estimated future network load information; and
   said public mobile communication network is accessed by said at least one communication device at said favorable time and date.

9. The system according to claim 8, further comprising a broadcast unit of said mobile communication network for broadcasting said estimated future network traffic load information to at least one said device via said mobile communication network.

10. The system according to claim 8, further comprising a device identifier module for said communication device determining the favorable time and date of an access depending on a device identifier of said device.

11. The system according to claim 8, further comprising a random number generator for said communication device determining the favorable time and date of an access depending on a random number.

12. The system according to claim 8, wherein said communication device is a terminal accessing said mobile communication network for uploading data to a server connected to said mobile communication network.

13. The system according to claim 8, further comprises a device identifier module, and said access control unit determines the favorable time and date of the access with consideration of an urgency of data transmission.

14. The system according to claim 8, wherein said device identifier module identifies a mobile subscriber identity.

* * * * *